March 13, 1956 — F. W. SEYBOLD — 2,737,827

AUTOMATIC TRANSMISSION

Filed May 27, 1952 — 3 Sheets-Sheet 1

INVENTOR.
Frederick W. Seybold

March 13, 1956  F. W. SEYBOLD  2,737,827
AUTOMATIC TRANSMISSION
Filed May 27, 1952  3 Sheets-Sheet 2

INVENTOR.
Frederick W. Seybold

March 13, 1956  F. W. SEYBOLD  2,737,827
AUTOMATIC TRANSMISSION
Filed May 27, 1952  3 Sheets-Sheet 3
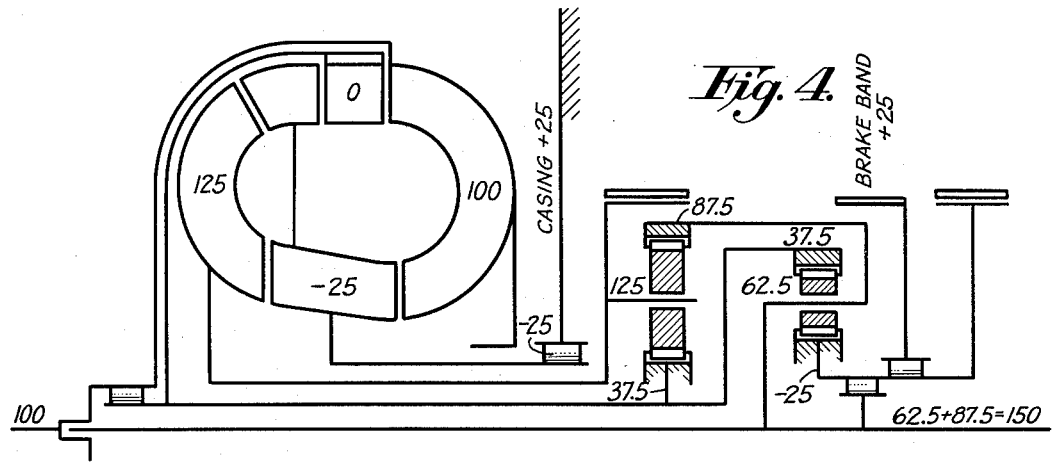
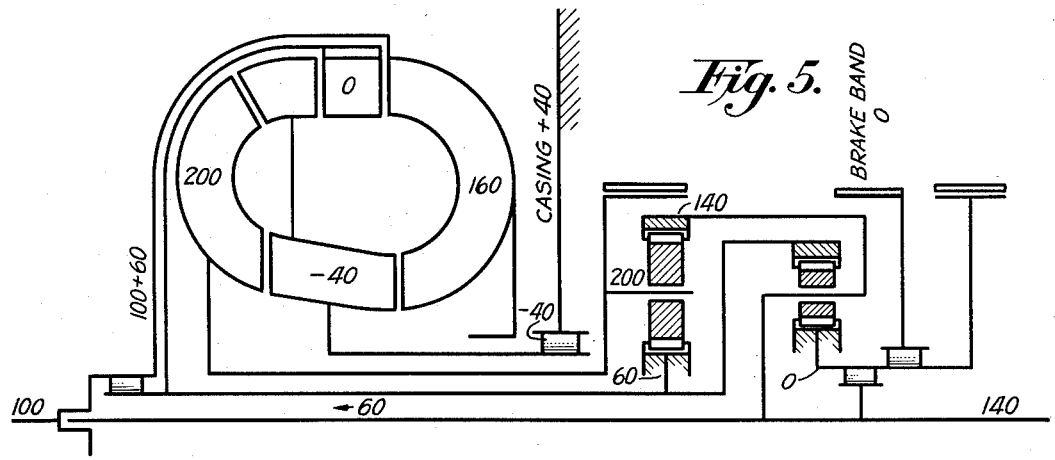
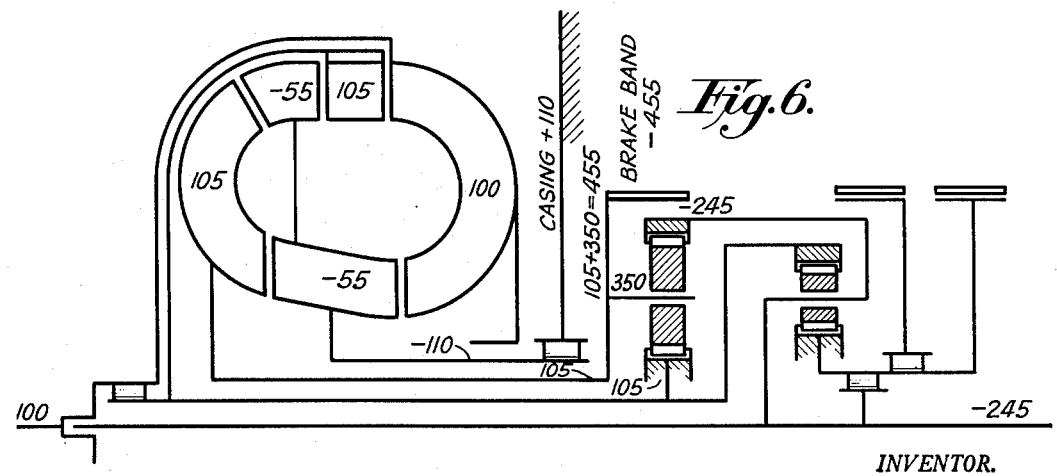
INVENTOR.
Frederick W. Seybold

United States Patent Office 2,737,827
Patented Mar. 13, 1956

2,737,827

AUTOMATIC TRANSMISSION

Frederick W. Seybold, Scotch Plains, N. J.

Application May 27, 1952, Serial No. 290,188

10 Claims. (Cl. 74—677)

This invention relates to automatic transmissions, and particularly to the combination of a novel fluid torque converter and variable speed gearing for transmitting power from an engine to the driven shaft of an automotive vehicle, such as passenger cars, trucks, tanks or other applications where torque conversion requirements are encountered.

Variable speed transmissions employing a fluid coupling or a torque converter connected in series with a geared drive are well known in the art and have become more or less standard equipment for passenger automobiles. All of them, however, require complex controls for effecting the various speed ratios by means of hydraulic valves, governors, clutches and brakes.

The hydraulic circuits for effecting the program of alternate engagement and disengagement of these clutches and brakes are also subject to malfunction and create maintenance problems.

Those transmissions which for ordinary driving conditions employ solely a torque converter to provide increased torque for acceleration of the vehicle from standstill are also in use, but due to their limited torque multiplication ability require increased engine power to give satisfactory starting performance.

Having the foregoing in mind, it is a primary object of the present invention to provide a variable speed transmission of extreme simplicity, whereby the objections referred to are eliminated.

It is a further object of this invention to provide a power transmission which is capable of multiplying the applied engine torque for starting a vehicle from rest and then progressively decrease the delivered torque with an increase in vehicle speed and to pass into approximately a direct drive ratio without torque multiplication in a smooth and imperceptible manner.

Still another object of this invention is to provide a torque and speed controlled transmission which can automatically adapt itself to the required torque demand.

Another object of this invention is to combine some of the elements of a novel fluid torque converter with certain elements comprising the variable speed gearing to increase the overall torque multiplication for starting and by the use of an overrunning clutch in connection with said novel gearing change the transmission ratio to direct for driving the vehicle above a certain speed.

A still further object of this invention is to provide a reverse speed without the addition of an auxiliary gear set.

It is also an object of this invention to provide a device to prevent the vehicle from rolling backward when the transmission is conditioned for forward operation.

Still another object of this invention is the provision of means for hill braking and taxi-push starting.

This invention includes other novel features of construction which render this transmission eminently practical and superior in operation. Obviously, minor changes can be made in this embodiment of the invention, it being understood that such changes come within the scope of the claims.

The above objects and advantages will become apparent upon reference to the following description taken in connection with the accompanying drawings, in which:

Figure 4 is a similar diagrammatic view showing the torque distribution at the instant the first turbine has attained the speed of the impeller;

Figure 5 is another similar diagrammatic view showing the torque distribution at the instant the reaction torque on one of the planetary gear sets becomes zero and "feedback" torque to the input member occurs;

Figure 6 is a similar view showing the torque distribution on the components of the transmission in terms of 100 units of input torque, when the control is set for reverse operation.

GENERAL ARRANGEMENT

Figure 1:
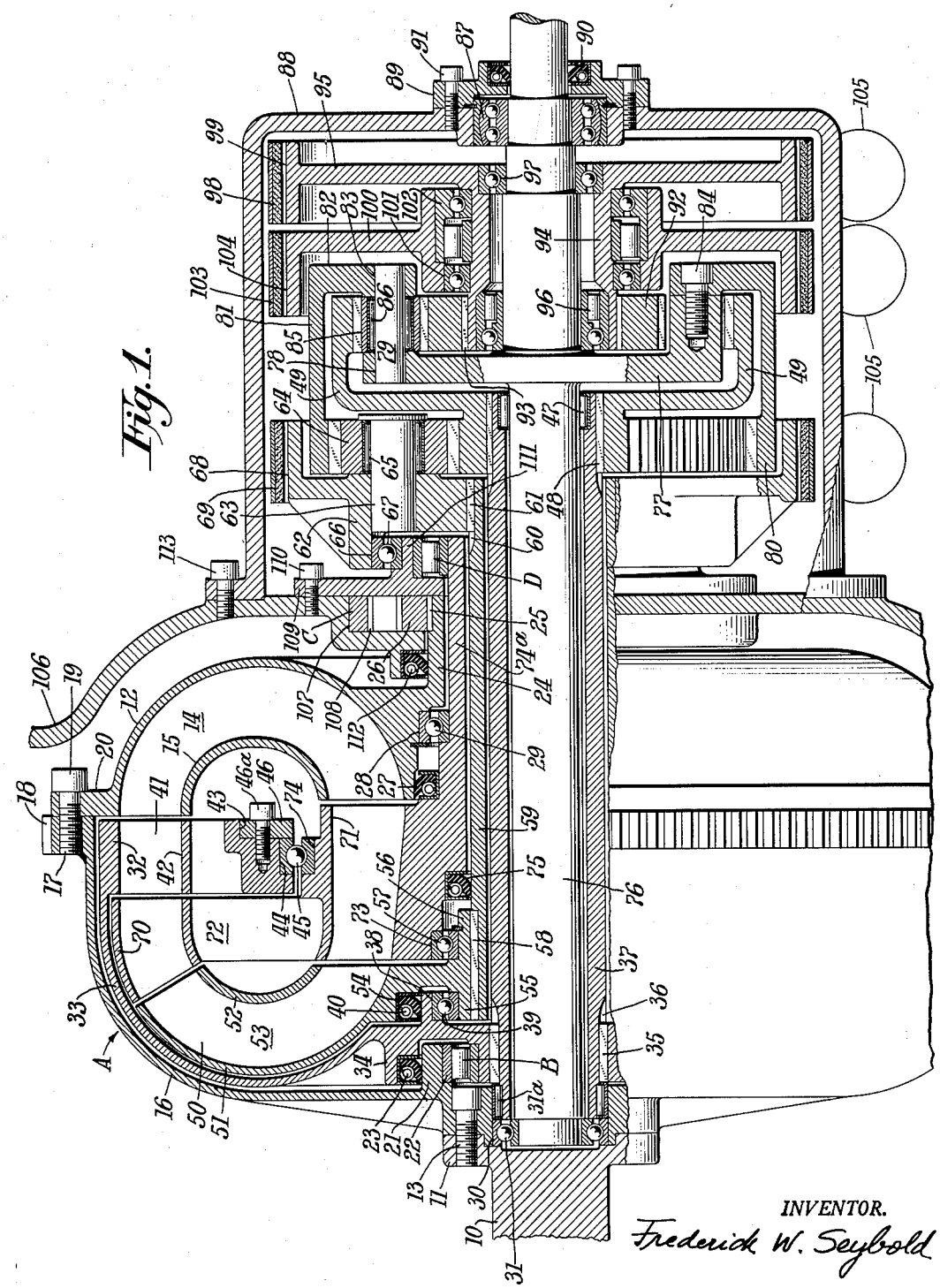
Figure 1 is a vertical, longitudinal section through a power transmission constructed according to my invention.

In general this invention comprises the combination of a multiple turbine torque converter of relatively low torque multiplication ability at stall which when joined with interconnected planetary gear sets produces a transmission which is capable of providing sufficient torque for rapidly accelerating a vehicle from rest and by its own progressive action results in a continuously decreasing torque and speed ratio until a 1:1 speed ratio is attained, at which time the converter operates as a highly efficient fluid coupling.

The converter is composed of a pump driven by the engine and said pump discharges oil into a first turbine which is connected to one each of the gears comprising the interconnected planetary gear sets.

The first turbine discharges the oil into a first stator to re-direct the oil into the second turbine element which is connected to the planetary carrier of the first planetary gear set. From this second turbine the oil is discharged into a second stator which re-directs the flow of oil so that it again enters the pump with a minimum of shock.

The two stators are connected and their reaction torque is transmitted through a one-way brake to the stationary transmission casing, and when said reaction torque vanishes rotation of the stators in the direction of rotation of the pump and turbines is accommodated by said one-way brake.

A gear reaction member is provided by the second planetary gear set whereby further torque multiplication is procured. This reaction mamber may transmit its torque either through a one-way brake to a brake wheel or it may be braked directly.

The output member of the transmission is connected to the carrier of the second planetary gear set and to one of the gears of the first planetary gear set.

To secure reverse operation of the transmission a brake element is provided on the carrier of the first planetary gear set.

When the vehicle is accelerated from standstill the speed ratio between the first and second turbine is determined by the gear proportions of the second planetary gear set, and the speed of the second turbine being less than the speed of the first turbine, hence the latter will attain or approximate the speed of the pump first, but it is prevented from exceeding the pump speed by an overrunning clutch mounted between the drive shaft and the first turbine.

A further rise in speed of the second turbine will then relieve the reaction member of the second planetary gear set and no further power will be transmitted through the first turbine and all of the power will be transmitted through the second turbine to the planetary carrier on which its planetary pinions will divide the power between the gears meshing therewith, transmitting the larger portion to the driven shaft and the smaller portion to the drive shaft through the overrunning clutch between the first turbine and said drive shaft.

This portion of the transmitted power which is "fed back" to the drive shaft augments the transmitted multiplied engine torque which is applied to the second turbine and contributes to the relatively high efficiency of the transmission which is attained by this invention at the point of transition when the planetary gearing ceases to function as a torque converter.

A second overrunning clutch is mounted between the driven shaft and the reaction member of the second planetary gear set which serves to prevent "roll-back" of the vehicle, provided any one or both of the brake elements associated with said reaction member is applied.

The complete absence of clutching elements of the friction type in this transmission is to be noted and starting the vehicle from rest with relatively large torque multiplication without cross-over shifting of clutches and/or brakes to bring the transmission into the 1:1 speed ratio is attained through the progressive action of the fluid torque converter and interconnected planetary gearing, whereby suitable transmission ratios are provided as demanded by road and traffic conditions.

STRUCTURAL ARRANGEMENT

The transmission according to this invention can best be understood by dividing it into seven assemblies, which will now be described in detail.

1. The driving assembly

The driving assembly comprises the drive shaft 10 which is provided with a flange 11 for mounting a hydrokinetic torque converter "A" by means of the screws 13. Curved blades 14 are equally spaced between the outer shell 12 and the inner shell 15 forming the impeller of the torque converter. A shell 16, which is welded to a flange 17, into which teeth 18 for the starter pinion are cut, is fastened by means of screws 19 to the flange 20 of the outer shell 12 of the converter "A." A hub 21 is provided on the shell 16 to receive at its inner diameter the outer member 22 of an overrunning clutch "B," and its outer diameter accommodates the oil seal 23.

The shell 12 is also provided with a hub 24 with splines 25 to which one of the pump gears 26 of a gear pump "C" is connected. The shell 12 is further provided with a smooth surface to accommodate the oil seal 27, as well as a bore 28 for receiving the ball bearing 29. The shell 16 has a bore 30 for mounting the ball bearing 31, as well as the needle bearing 31a.

2. The first turbine assembly

The first turbine assembly consists of the turbine 32 composed of the toroidal shell 33 and the hub 34 to accommodate the oil seal 23 and the inner member of the overrunning clutch "B." The hub 34 is also provided with internal splines 35 which fit over the splines 36 of the long sleeve 37.

The hub 34 is further provided with a bore 38 to receive the outer race of the ball bearing 39 and its outer diameter is suitable to accommodate the oil seal 40.

Curved blading 41 is equally spaced between the outer shell 33 and the inner ring 42 which is provided with a recess 43 and a bore 44 for the reception of the outer race of the ball bearing 45. A plate 46 fastened by means of the screws 46a keeps bearing 45 in position.

The long sleeve 37 is supported at its left-hand end on the needle bearing 31a and at its right-hand end on the needle bearing 47. The right-hand end of the sleeve 37 is further provided with multiple splines 48 which fit into the internal multiple splines of the compound sun and internal gear 49.

3. The second turbine assembly

The second turbine assembly comprises the turbine 50 composed of the outer toroidal shell 51 and inner toroidal shell 52. Curved blades 53 are equally spaced between the shells 51 and 52. The shell 51 is provided with a bore 54 for supporting the oil seal 40 and a hub 55 for receiving the inner race of the ball bearing 39. Another hub 56 accommodates the inner race of the ball bearing 57. The hub 55—56 is provided with internal multiple splines 58 which fit over the external multiple splines of the long sleeve 59, which at its right-hand end is provided with external multiple splines 60. The latter fit into the internal multiple splines 61 of the planetary pinion carrier 62. Studs 63 are securely mounted in carrier 62 and planetary pinions 64 provided with needle bearing 65 are free to rotate thereon. Carrier 62 is also provided with a suitable bore 66 to receive the outer race of the ball bearing 67. The carrier 62 is further equipped with a large diameter cylindrical surface 68 for the application of the brake band 69 to prevent the rotation of the entire second turbine assembly.

4. The stator assembly

The stator assembly consists of the large diameter stator 70 and the small diameter stator 71 which are connected by the spacing ribs 72 between the inner walls of both stators. The smaller stator 71 provides a suitable recess 73 for the reception of the outer race of the ball bearing 57 and a suitable cylindrical surface 74 for accommodating the inner race of the ball bearing 45, also suitable shoulders are provided on the smaller stator 71 for carrying the oil seals 27 and 75 which co-operate respectively with the impeller and the long sleeve 59.

The smaller stator 71 has a long hub 74a on which are carried the inner race of the ball bearing 29 and the inner member of a one-way brake "D," which prevents the rotation of the stator assembly in a direction opposite to that of the drive shaft 10, but permits rotation of the stator assembly in the same direction as that of the drive shaft 10.

5. The driven assembly

The driven assembly comprises the long shaft 76 whose left-hand end is shouldered to receive the inner race of the ball bearing 31. A disc portion 77 integral with the driven shaft 76 provides suitable bores 78 for supporting the planetary pinion shafts 79. An internal gear 80 has a shell portion 81 and a flange 82 with suitable bores 83 in line with the bores 78 for supporting the shafts 79 also and for the screws 84 to fasten the internal gear 80 to the disc portion 77.

Planetary pinions 85 provided with needle bearings 86 are free to rotate on the shafts 79. The planetary pinions 64 mesh with the internal gear 80 and the sun gear of the compound sun and internal gear 49.

The planetary pinions 85 mesh with the internal gear of the compound sun and internal gear 49 and the sun gear of the reaction assembly yet to be described. The needle bearing 47 previously mentioned is journalled on the driven shaft 76 and supports the right-hand end of the long sleeve 37. A self-aligning ball bearing 87 supports the right-hand end of the driven shaft 76 and it is mounted in the transmission casing 88 and is held in place by the retainer 89 which is secured to the casing 88 by means of the screws 91. An oil seal 90 is mounted in the retainer 89 to prevent leakage of oil from the casing 88.

6. The reaction assembly

The reaction assembly consists of the sun gear 92 whose teeth mesh with the planetary pinions 85 of the driven assembly. The sun gear 92 is equipped with internal splines 93 which fit over the external splines of the hub 94 of the brake wheel 95.

A combination ball bearing and overrunning clutch 96 supports the hub 94 on the driven shaft 76 and this overrunning clutch prevents the driven shaft 76 from rotating in a direction opposite to that of the drive shaft 10, provided the sun gear 92 is braked.

A ball bearing 97 supports the brake wheel 95 on the driven shaft 76. A brake band 98 can be applied to the large cylindrical surface 99 of the brake wheel 95.

A second brake wheel 100 is mounted on the hub 94 on the ball bearing 101 and combination ball bearing and one-way brake 102. A brake band 103 can be applied to the large cylindrical surface 104 of the brake wheel 100 and when so applied the sun gear 92 is prevented from rotation in a direction opposite to that of the drive shaft 10 by said one-way brake 102, but rotation of the sun gear 92 in the same direction as that of the drive shaft 10 can take place without release of the brake band 103 from the brake wheel 100.

The brake bands 69, 98, and 103 are engaged with their respective brake wheels by any suitable means, preferably by hydraulically operated pistons in cylinders, indicated by reference numeral 105, acting through a linkage on the brake bands.

7. The casing and gear pump assembly

The casing in which the entire transmission is housed consists of several sections for convenience of assembly. The section 106 conforms to the general shape of the torque converter and is fastened to the engine frame (not shown).

This section is provided with a recess 107 in which the internal tooth gear pump "C" composed of internal gear 108 meshing with the previously mentioned pump gear 26 is installed. This pump delivers pressure oil for the operation of the brake bands as well as keeping the converter properly filled. The pump cover plate 109 is secured to the casing 106 by means of the screws 110 and a hub 111 provides externally a support for the inner race of the ball bearing 67 and internally a support for the outer member of the one-way brake "D."

An oil seal 112 is also mounted in the casing section 106 to prevent leakage of oil from the converter and gear pump.

The cup-shaped casing 88, which is secured to the casing section 106 by means of the screws 113, surrounds the planetary gear assembly and contains the brake bands and their associated actuating mechanism.

OPERATION

A. Idling or "neutral" operation

With the vehicle brakes applied and the engine idling and all of the brake bands 69, 98, and 103 in their released condition the driven shaft 76 remains stationary.

For the purpose of illustrating the design of a transmission of this invention the following gear proportions have been chosen:

|  | First gear set, teeth | Second gear set, teeth |
|---|---|---|
| Sun gear | 30 | 48 |
| Planet pinion | 20 | 12 |
| Internal gear | 70 | 72 |

For one revolution of the drive shaft or impeller the various assemblies make:

| | Revolutions |
|---|---|
| Driving assembly | 1 |
| First turbine assembly | 1 |
| Second turbine assembly | .3 |
| Stator assembly | 0 |
| Reaction assembly | −1.5 |
| Driven assembly | 0 |

B. Forward drive operation

With the foot brake applied the transmission control lever is shifted from the neutral position into the driving position and as a result the brake band 103 is applied to the brake wheel 100 and the rotation of the reaction sun gear 92, the first and second turbine assemblies ceases.

Upon release of the foot brake and an acceleration of the engine its torque will be multiplied both by the converter and by the sun gear reaction member 92.

Figure 3:
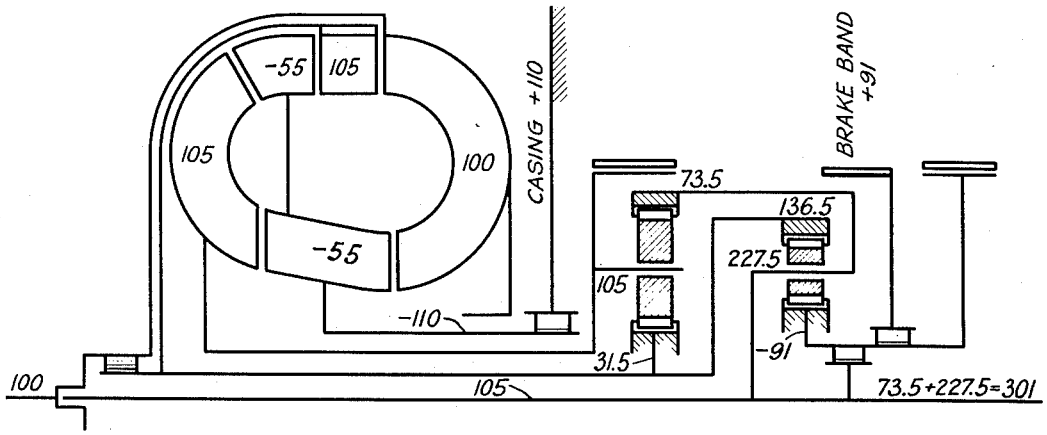
Figure 3 is a diagrammatic view of the transmission showing the torque distribution on its components in terms of 100 units of input torque at stall.

If the design of the converter is such that the developed torque is divided equally between the first and second turbine assemblies at stall the various torque relationships of the transmission are shown in Figure 3, with a torque multiplication of 2.1 in the converter and the gear data being as stated above.

These torque values are based on 100 units of engine input torque and 301 units of torque will then be applied to the driven shaft 76 at the beginning of motion of the vehicle.

The speed ratio between the first and second turbine is determined by the gear proportions of the planetary gear sets and with the tooth data as stated before, then for one revolution of the first turbine the second turbine will make .72 revolution.

The speed of both turbines increases, but this speed ratio is maintained until the speed of the first turbine approaches that of the impeller when nearly all of the torque is delivered by the second turbine alone.

Figure 2:
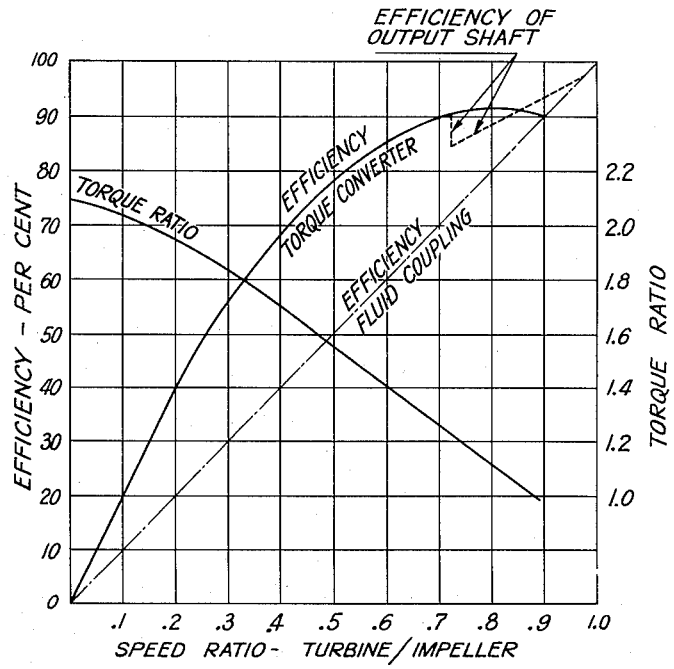
Figure 2 is a graph showing the torque ratio of the converter in relation to the speed ratio of turbine to impeller and the corresponding efficiency of the converter and the efficiency of the output shaft.

So that when the speed ratio between the second turbine and the impeller is .72 the torque multiplication ratio has a value of 1.25 as shown on the graph of Figure 2, therefore, if the engine torque is represented by 100 units the applied torque on the second turbine is 125 units, while the applied torque of the first turbine is zero.

The torque applied to the driven shaft 76 is now 150 units and its speed is .6 revolution for one revolution of the drive shaft 10. The efficiency of the entire transmission (neglecting friction losses) is, $$\frac{150 \times .6}{100} = \frac{90}{100}$$

or 90%.

Now when the speed ratio of the second turbine exceeds .72 and because the first turbine cannot overrun the drive shaft 10, being prevented from doing so by the overrunning clutch "B," the second planetary gear set no longer functions as a torque converter and the sun gear 92 begins to rotate in the direction of the drive shaft 10 as soon as the speed of the driven shaft 76 exceeds .6 revolution for one revolution of the drive shaft.

The torque delivered by the second turbine to the carrier 62 is divided by the planet pinions 64 between the internal gear 80 of the driven assembly and the sun gear of the first turbine assembly and this portion of the torque is "fed back" through the overrunning clutch "B" to the impeller.

This augmented input torque is again multiplied by the then prevailing torque multiplication ratio as depicted in Figure 2. If the torque applied on the carrier 62 is represented by T and from the tooth proportions of the first gear set the torque which would be "fed back" to the impeller amounts to .3T and .7T would be transmitted to the internal gear 80.

If the torque multiplication ratio is 1.25 for the turbine/impeller speed ratio of .72, then $$T = 1.25(100 - .3T)$$
$$= 1.25 \times 100 - .375T$$
$$= \frac{125}{.625}$$
$$= 200 \text{ units}$$

The output shaft will, therefore, receive .7T or 140 units of torque, while .3T or 60 units of torque will be "fed back" to the impeller as shown in Figure 5.

The speed of the output shaft is .6 revolution for one revolution of the drive shaft 10 and the efficiency of the entire transmission is, therefore, $$\frac{140 \times .6}{100} = \frac{84}{100}$$

or 84% at the point of transition when the second planetary gear set ceases to function as a torque converter.

The efficiency of the converter, however, is $$\frac{200 \times .72}{160} = \frac{144}{160}$$

or 90%.

The second turbine continues to increase in speed relative to the impeller and finally the second turbine will attain a speed ratio of .9 at which time the torque converter will begin to function as a fluid coupling, the fluid in the converter impinging on the stators to compel their rotation in the direction of the drive shaft.

The efficiency of the converter including gearing thereby attained is approximately 97% and a sudden increase in torque demand will automatically restore the transmission to its torque converting ability without the intervention of the driver or of auxiliary mechanism.

C. Down-hill braking

By the application of the brake band 98 to the brake wheel 95 the rotation of the sun gear 92 is stopped and the transmission will be forced to operate in the speed ratio of the second gear set which is 1.67:1 or approximately equivalent to intermediate gear of a conventional gear shift transmission.

D. Reverse drive operation

For reverse operation of the transmission the brake band 69 is applied to the brake wheel 68 of the carrier 62, while the bands 98 and 103 are in their released condition, whereby the second turbine assembly remains stationary and the first turbine alone delivers torque to the sun gear of the first planetary gear set only.

This torque relationship between the elements which transmit power in reverse operation is depicted in Figure 6. The speed ratio is 2.33:1 from the tooth proportions of the first planetary gear set and the output shaft torque is 245 units for each 100 units of engine torque applied to the drive shaft 10.

E. No-roll-back

This desirable feature, which prevents the vehicle from moving backward when it is stopped on an incline and the brake band 103 is applied as would be the case for normal forward operation, is provided by the overrunning clutch 96 between the driven shaft and the reaction sun gear 92.

When the transmission is in neutral or is conditioned for reverse operation the reaction sun gear rotates "backward" at a higher rate of speed than that of the driven shaft 76, therefore, the "no-roll-back" device becomes automatically ineffective.

While this transmission has been described in detail, it is obvious that various modifications, rearrangements and minor improvements will suggest themselves to those skilled in the art. For example, the band brakes can readily be replaced by positive brakes, such as a toothed wheel and pawl or a combination of both band and positive brakes, if that should be necessary or desirable.

It should further be understood that the gear proportions illustrated may be varied greatly to accommodate various operating conditions. Such modifications shall fall within the scope of the following claims.

I claim:

1. A continuously variable speed and torque transmission comprising in combustion, a drive shaft, a driven shaft, a multiple element hydraulic torque converter, a first element of which is connected to the drive shaft, a first planetary pinion carrier connected to a second element of said torque converter, a first sun gear and a first internal gear connected to a third element of said torque converter, a two-element stator, a second sun gear, a movable brake means, one-way brake means between said second sun gear and said movable brake means, stationary brake means cooperating with said movable brake means, a second planetary pinion carrier and a second internal gear connected to the driven shaft, planetary pinions on said first carrier meshing with said first sun gear and said second internal gear, planetary pinions on said second carrier meshing with said first internal gear and said second sun gear, overrunning clutch means between the first and third elements of said torque converter, to cause the driven shaft to begin to rotate with increased torque when said stationary brake means is applied to said movable brake means and to gradually reduce the torque applied to the driven shaft with increased speed of said drive and driven shafts.

2. A continuously variable speed and torque transmission comprising in combination, a drive shaft, a driven shaft, a multiple element hydraulic torque converter, a first element of which is connected to the drive shaft, a first planetary pinion carrier connected to a second element of said torque converter, a first sun gear and a first internal gear connected to a third element of said torque converter, a two element stator with means to permit its rotation in the direction of that of the dirve shaft only, a second sun gear, movable brake means, one-way brake means between said second sun gear and said movable brake means, stationary brake means cooperating with said movable brake means, a second planetary pinion carrier connected to the driven shaft, a second internal gear connected to the driven shaft, planetary pinions on said first carrier meshing with said first sun gear and said second internal gear, planetary pinions on said second carrier meshing with said first internal gear and said second sun gear, overrunning clutch means between said first and third elements of said torque converter, to cause the driven shaft to begin to rotate with increased torque when said stationary brake means is applied to said movable brake means and to gradually effect one-to-one ratio drive between said drive and driven shaft.

3. In a continuously variable speed and torque transmission comprising in combination, a drive shaft, a driven shaft, two interconnected planetary gear sets each having an internal gear, a sun gear and a planetary pinion carrier with its pinions in mesh with said internal and sun gears respectively, a fluid torque converter having a pump element, first and second turbine elements, and first and second stator elements with means to permit their rotation in one direction only, said pump being connceted to the drive shaft, the sun gear of one of the gear sets being connected to the internal gear of the other gear set and to one of said turbine elements, the other turbine element being connected to one of the carriers, the other internal gear being connected to the other carrier and the driven shaft, the other sun gear being provided with one-way brake means, movable brake means in cooperaitng relation with said one-way brake means, and stationary brake means cooperating with said, movable brake means, and one-way clutch means bewteen said pump and said one of said turbine elements, whereby said one turbine element returns to said pump a portion of the torque transmitted by said other turbine element.

4. In a continuously variable speed and torque transmission comprising in combination, a drive shaft, a driven shaft, two interconnected planetary gear sets each having an internal gear, a sun gear and a planetary pinion carrier with its pinions in mesh with said internal and sun gears respectively, a fluid torque converter having a pump element, first and second turbine elements, and first and second stator elements with means to permit their rotation in the direction of the drive shaft only, said pump being connected to the drive shaft, the sun gear of one of the gear sets being connected to the internal gear of the other gear set and to said first turbine element, the other turbine element being connected to one of the carriers, said carrier being provided with brake means, the other internal gear being connected to the other carrier and the driven shaft, the other sun gear being provided with brake means, stationary brake means cooperating therewith, and stationary brake means cooperating with the brake means on said carrier, to selectively cause the transmission to operate in the forward or reverse direction respectively when one or the other stationary brake means is applied, and overrunning clutch means between said first turbine element and said pump, whereby to establish a substantially direct drive ratio.

5. In a continuously variable speed and torque transmission comprising in combination, a drive shaft and a driven shaft, a multi-turbine-stator torque converter interconnected with two planetary gear sets positioned between said drive shaft and said driven shaft, the pump element of said converter being connected to the drive shaft, a first planetary pinion carrier being connected to a first turbine element of said converter, the sun gear of the first gear set and the internal gear of the second gear set being connected to the second turbine element of said torque converter, a two-element stator, one element of the stator being operatively positioned between said first and second turbine elements, and the other element of the stator being operatively positioned between said pump and said first turbine, the sun gear of the second gear set being provided with brake means and one-way brake means, the internal gear of the first gear set and the carrier of the second gear set being connected to the driven shaft, the planetary pinions on the first carrier meshing with the sun and internal gear of the first gear set, the planetary pinions of the second carrier meshing with the sun and internal gear of the second gear set, brake means on said first planetary pinion carrier, movable brake means cooperating with the one-way brake means on the sun gear of the second gear set, stationary brake means to selectively cooperate with the brake means of said first carrier, said movable brake means or the brake means on the sun gear of the second gear set, and one-way clutch means between said drive shaft and said second turbine element, whereby to establish a substantially direct drive ratio.

6. In a continuously variable speed and torque transmission comprising in combination, a drive shaft and a driven shaft, a multi-turbine-stator torque converter interconnected with two planetary gear sets positioned between said drive shaft and said driven shaft, the pump element of said converter being connected to the drive shaft, a first planetary pinion carrier being connected to a first turbine element of said converter, the sun gear of the first gear set and the internal gear of the second gear set being connected to the second turbine element of said torque converter, overrunning clutch means between said pump and second turbine element, a two-element stator, one element of the stator being operatively positioned between said first and second turbine elements, and the other element of the stator being operatively positioned between said pump and said first turbine, the sun gear of the second gear set being provided with brake means and one-way brake means, the internal gear of the first gear set and the carrier of the second gear set being connected to the driven shaft, the planetary pinions on the first carrier meshing with the sun and internal gear of the first gear set, the planetary pinions of the second carrier meshing with the sun and internal gear of the second gear set, brake means on said first planetary pinion carrier, movable brake means cooperating with the one-way brake means on the sun gear of the second gear set, stationary brake means to selectively cooperate with the brake means of said first carrier, said movable brake means or the brake means on the sun gear of the second gear set.

7. In a continuously variable speed and torque transmission comprising in combination, a drive shaft and a driven shaft, a multi-turbine-stator torque converter interconnected with two planetary gear sets positioned between said drive shaft and said driven shaft, the pump element of said converter being connected to the drive shaft, a first planetary pinion carrier being connected to a first turbine element of said converter, the sun gear of the first gear set and the internal gear of the second gear set being connected to the second turbine element of said torque converter, overrunning clutch means between said pump and second turbine element, a two-element stator, one element of the stator being operatively positioned between said first and second turbine elements, and the other element of the stator being operatively positioned between said pump and said first turbine, and one-way brake means to permit rotation of said stator elements in one direction, the sun gear of the second gear set being provided with brake means and one-way brake means, the internal gear of the first gear set and the carrier of the second gear set being connected to the driven shaft, the planetary pinions on the first carrier meshing with the sun and internal gear of the first gear set, the planetary pinions of the second carrier meshing with the sun and internal gear of the second gear set, brake means on said first planetary pinion carrier, movable brake means cooperating with the one-way brake means on the sun gear of the second gear set, stationary brake means to selectively cooperate with the brake means of said first carrier, said movable brake means or the brake means on the sun gear of the second gear set.

8. In a continuously variable speed and torque transmission comprising in combination, a drive shaft and a driven shaft, a multi-turbine-stator torque converter interconnected with two planetary gear sets positioned between said drive shaft and said driven shaft, each gear set having an input member, an output member and a torque amplifying member, the pump element of said converter being connected to the drive shaft, a first turbine element being connected to the input planetary pinion carrier member of the first gear set, a second turbine member being connected to the torque amplifying sun gear member of the first gear set and the input internal gear of the second gear set, one-way clutch means between said second turbine element and said pump element, the driven shaft being connected to the output internal gear member of the first gear set and the planetary pinion carrier output member of the second gear set, the torque amplifying sun gear member of the second gear set being connected to a brake, a two-element stator, one of the stator elements of said converter being positioned between said turbine elements and the other between the first turbine element and the pump element, and stationary brake means for selective cooperation with the brake on said sun gear member.

9. In a continuously variable speed and torque transmission comprising in combination, a drive shaft and a driven shaft, a multi-turbine-stator torque converter interconnected with two planetary gear sets positioned between said drive shaft and said driven shaft, each gear set having an input member, an output member and a torque amplifying member, the pump element of said converter being connected to the drive shaft, a first turbine element being connected to the input planetary pinion carrier member of the first gear set, a second turbine member being connected to the torque amplifying sun gear member of the first gear set and the input internal gear of the second gear set, one-way clutch means between said second turbine and said pump, the driven shaft being connected to the output internal gear member of the first gear set and the planetary pinion carrier output member of the second gear set, the torque amplifying sun gear member of the second gear set being connected to a movable brake, a two-element stator, one of the stator elements of said converter being positioned between said turbine elements and the other between the first turbine element and the pump element, one-way brake means to permit said stator elements to rotate in the direction of the drive shaft, and stationary brake means for selective cooperation with the movable brake on said sun gear member.

10. In a continuously variable speed and torque transmission comprising in combination, a drive shaft and a driven shaft, a multi-turbine-stator torque converter interconnected with two planetary gear sets positioned between said drive shaft and said driven shaft, each gear set having an input member, an output member and a torque amplifying member, the pump element of said converter being connected to the drive shaft, a first turbine element being connected to the input planetary pinion carrier member of the first gear set, a second turbine member being connected to the torque amplifying sun gear member of the first gear set and the input internal gear of the second gear set, the driven shaft being connected to the output internal gear member of the first gear set and the planetary pinion carrier output member of the second gear set, the torque amplifying sun gear member of the second gear set being connected to a brake, a two-element stator, one of the stator elements of said converter being positioned between said turbine elements and the other between the first turbine element and the pump element, one-way brake means to permit rotation of said stator elements in the direction of the drive shaft, overrunning clutch means between the drive shaft and said second turbine element, and overrunning clutch means between the driven shaft and said second sun gear, a movable brake, one-way brake means between said movable brake and said second sun gear, two stationary brake means when simultaneously or selectively applied to said movable brake and/or the brake on said second sun gear, reverse rotation of the driven shaft is prevented by said overrunning clutch means between the driven shaft and said second sun gear.

References Cited in the file of this patent
UNITED STATES PATENTS

| | | |
|---|---|---|
| 2,293,767 | Salerni | Aug. 25, 1942 |
| 2,373,122 | La Brie | Apr. 10, 1945 |
| 2,397,634 | Voytech | Apr. 2, 1946 |
| 2,562,464 | Jandasek | July 31, 1951 |
| 2,578,450 | Pollard | Dec. 11, 1951 |
| 2,616,308 | Burtnett | Nov. 4, 1952 |

FOREIGN PATENTS

| | | |
|---|---|---|
| 367,079 | Great Britain | Feb. 18, 1932 |
| 666,092 | Great Britain | Feb. 6, 1952 |